April 27, 1926.
A. A. KENT
PANEL CONDENSER
Filed May 8, 1925
1,582,826
2 Sheets-Sheet 2
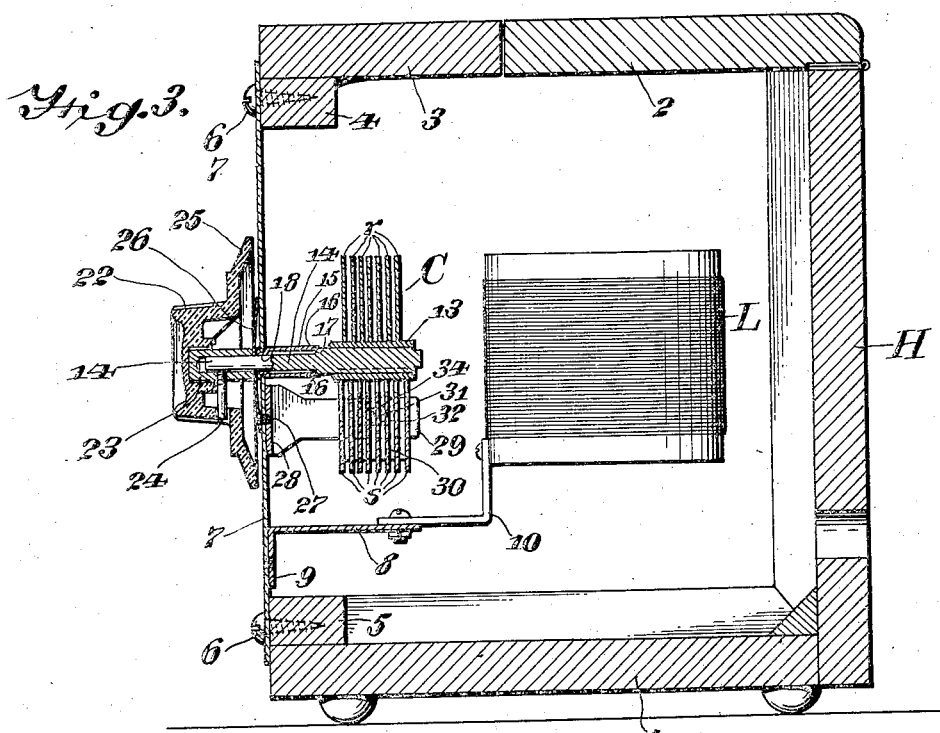
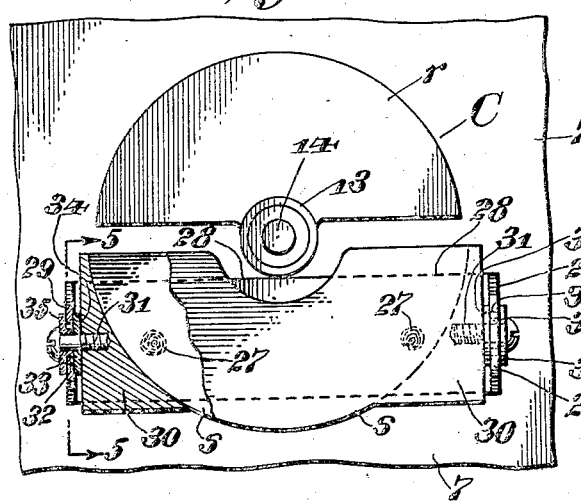
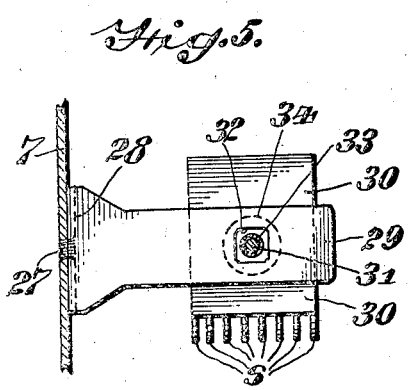
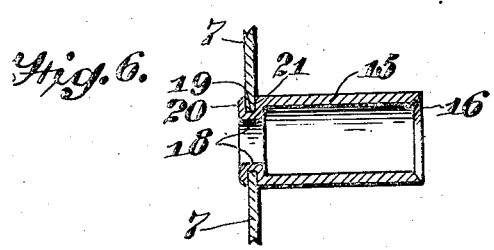
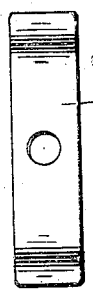
INVENTOR.
Arthur Atwater Kent
BY Cornelius D. Ehret
his ATTORNEY.

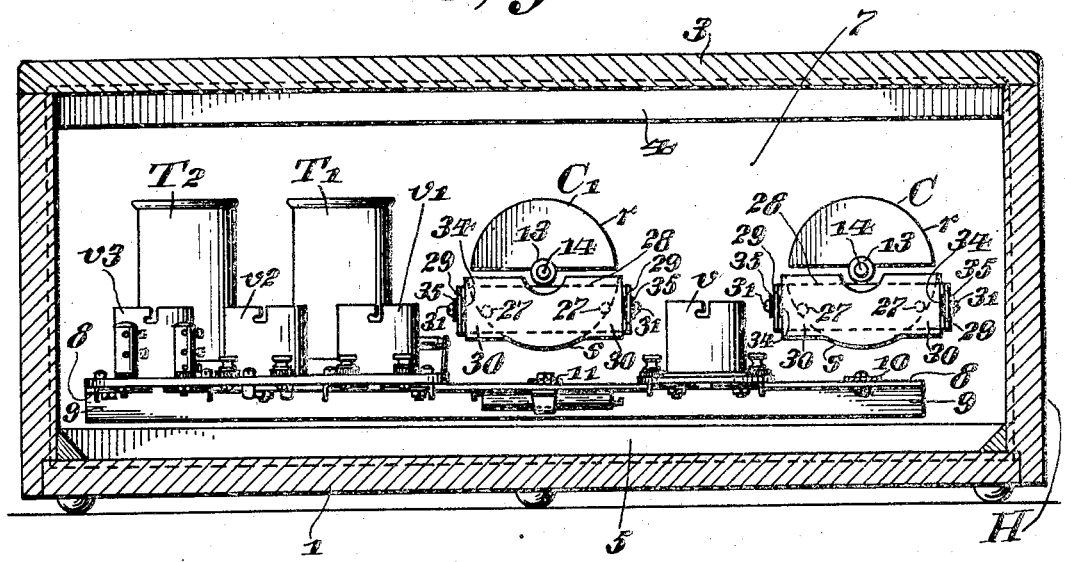

Patented Apr. 27, 1926

1,582,826

UNITED STATES PATENT OFFICE.

ARTHUR ATWATER KENT, OF ARDMORE, PENNSYLVANIA.

PANEL CONDENSER.

Application filed May 8, 1925. Serial No. 28,808.

*To all whom it may concern:*

Be it known that I, ARTHUR ATWATER KENT, a citizen of the United States, residing at Ardmore, county of Montgomery, and State of Pennsylvania, have invented certain new and useful Improvements in Panel Condensers, of which the following is a specification.

My invention relates to variable electrical condensers of the plate type utilizable for variation of capacity or tuning of circuits, particularly circuits traversed by high frequency current or oscillations, as in radio systems.

In accordance with one of the features of my invention, the panel, plate or wall of a radio receiving set is comprehended in or is a component part of the condenser structure or unit; and more particularly, the rotor and stator elements of the condenser are secured independently of each other to the panel, plate or wall, and the position of the rotor and stator with respect to each other is determined by the panel, plate or wall and their respective attachments thereto.

Further in accordance with my invention, the rotor, in a combination of the character aforesaid in which the panel is a component part of the condenser unit or structure, is carried by and overhung beyond a single bearing member secured directly to the panel and preferably independently of the stator-supporting structure.

Further in accordance with my invention, there is provided on the side of the panel opposite the rotor and stator a spring exerting thrust longitudinally of the axis of rotation of the rotor; more particularly, a floating or loosely mounted spring engaging the panel and a knob or handle upon the rotor shaft for exerting a thrust upon the shaft in a direction from the rear toward the front of the panel; and more particularly, my invention comprises a spring so employed upon the front or outer side of the panel when the latter is a component part of a condenser unit or structure.

Further in accordance with my invention, the panel, plate or wall may be common to or comprised in a plurality of condenser structures or units; and upon the panel, wall or plate may be mounted other devices or elements of the radio set.

Further in accordance with my invention, the stator element of a variable condenser of the plate type is rotatably adjusted with respect to the rotor about an axis substantially at right angles to the rotor axis, and more particularly, the axis of adjustment is disposed to one side of or does not intersect the rotor axis; more particularly, the center of gravity of the stator preferably lies in or adjacent the axis about which the stator is adjustable, and the stator is preferably secured to its supporting member only at the axis of adjustment; and more particularly, the stator, so adjustable about the aforesaid axis, is mounted for adjustment longitudinally of the axis of the rotor and in a direction substantially parallel with the planes of the rotor and stator plates.

My invention resides in apparatus of the character hereinafter described and claimed.

For an illustration of one of the various forms my invention may take, reference is to be had to the accompanying drawings, in which:

Fig. 1 is a horizontal sectional view, partly in plan, of a radio receiving set embodying my invention.

Fig. 2 is a vertical sectional view, partly in elevation, taken on the line 2—2 of Fig. 1.

Fig. 3 is a vertical sectional view, partly in elevation, on enlarged scale, taken on the line 3—3 of Fig. 1.

Fig. 4 is a rear end elevational view of condenser structure such as shown in Fig. 3, partly in section in the plane of the axis of rotatable adjustment of the stator element.

Fig. 5 is a vertical sectional view, partly in elevation, taken on the line 5—5 of Fig. 4.

Fig. 6 is a fragmentary sectional view, on enlarged scale, of the rotor bearing member.

Fig. 7 is an end elevational view of the spring.

Referring to the drawings, H is a housing or cabinet having the bottom 1, the hinged cover section 2 and the cover member 3, upon which and the bottom member 1 are secured the members 4 and 5, to which is secured by screws 6 the front panel, plate or wall member 7, preferably of sheet metal, as indicated, and which is comprised or included in a plurality of condenser structures or units.

On the inner side of the plate 7 is the ledge member 8, of sheet metal, having the downwardly extending flange 9 secured, as by spot welding, to the plate 7.

Secured upon the ledge 8, as by bracket 10, is the inductance or secondary winding of a transformer L connected in the input circuit of a radio frequency amplifier tube adapted to be inserted into the tube socket $v$, whose base is secured to the ledge 8. Carried upon the ledge 8 by a bracket 11 is a radio frequency transformer T, whose primary is in the anode circuit of the tube received in the socket $v$ and whose secondary circuit is connected in the input circuit of a detector tube adapted to be received in the socket $v^1$. In the anode circuit of the last mentioned tube is included the primary of the audio frequency transformer $T^1$, whose secondary circuit is in the input circuit of an audio frequency amplifier tube adapted to be received in the socket $v^2$. In the anode circuit of the last mentioned tube is included the primary of a second audio frequency transformer $T^2$, whose secondary is in the input circuit of a second stage audio frequency amplifier tube adapted to be received in the socket $v^3$, and in whose anode circuit is connected as usual a telephone, loud speaker or other signal-translating instrument. The tube sockets $v^1$, $v^2$, $v^3$ and the audio frequency transformers $T^1$, $T^2$ are mounted upon a base 12 secured upon the ledge 8.

Co-acting with the inductance or transformer secondary L and with the secondary of the radio frequency transformer T, respectively, are the tuning condensers C and $C^1$, each of a structure hereinafter described.

Heretofore it has been customary, particularly in the manufacture of radio receiving sets, to utilize for one or more of the tuning condensers such as C and $C^1$ a complete or self-contained condenser unit comprising a suitable support upon which are carried both the rotor and stator elements, and the unit as such and so complete in and of itself has been suitably attached or mounted upon the wall or panel of the cabinet containing the elements of a receiving set.

In accordance with one feature of my invention, however, I depart from this practice and build into each of the condenser structures or units the panel or wall, such as 7, upon and to which are secured independently of each other the supports for the rotor and stator elements.

The rotor or rotatable armature assembly of each of the condensers comprises the parallel plates $r$, which, in the example illustrated, are die cast integral with the hub 13 and the rotor shaft 14, it being understood, however, that these plates may be individual and suitably secured upon a shaft, such as 14.

The rotor comprising the plates $r$ is provided with a single bearing member or sleeve 15 having at its inner or free end a conical bearing seat 16 for the conical bearing 17 of the shaft or rotor structure, and having at its opposite end a lateral or cylindrical bearing at 18 for the shaft 14. The member 15 has a portion 19 of reduced diameter extending through the panel 7, and its outer end 20 is spun or worked over on the outer face of the panel 7, whereby the latter is confined between the end 20 and the shoulder 21 upon the member 15.

The knob or operating handle 22, of bakelite or the like, has molded therein the metallic insert member 23, in which is received the outer end of the shaft 14 and which is secured to the shaft by the set screw 24. Integral with the knob 22 is the dial 25, bearing graduations, with which coacts any suitable pointer carried by the panel 7.

On the side of the panel 7 opposite to the rotor structure, that is, on the outside of the panel, is the free or floating spring 26 having an aperture through which the shaft 14 loosely extends, and preferably bowed, as indicated, to engage at its outer ends the outer face of the panel 7, between which and the aforesaid insert 23 it is confined. The action of the spring is such as to exert a thrust outwardly, that is, toward the left, Fig. 3, upon the shaft 14, thereby holding the conical bearing 17 snugly in the conical seat or bearing 16 in the single bearing member 15, to the right or beyond which is overhung the rotor proper.

Secured to the inner side of the panel 7 by any suitable means, as spot welds 27, and independently of the rotor structure and its support or bearing member 15, is the stator support comprising the member 28 having the rearwardly outstanding sides or arms 29.

The stationary armature assembly or stator of the condenser comprises the spaced parallel plates $s$, with which are adapted to interleave the rotor plates $r$, as well understood in the art. The stator plates $s$ may be held in a group or unit by any suitable means. In the example illustrated, however, they are die cast integral with the oppositely disposed side elements 30, 30, into which are threaded the screws 31, 31 extending through apertures 32. Surrounding each screw 31 is an insulating bushing 33, and between each side member 30 and its adjacent supporting arm 29 is an insulating washer 34, and between each screw head and its adjacent supporting arm 29 is an insulating washer 35, the bushings and washers serving to insulate the stator from its support.

The stator is in effect pivoted or rotatably adjusted about an axis with which the longitudinal axes of the screws 31 are coincident. This axis of adjustment extends at right angles to the axis of the shaft 14 or the axis of rotation of the rotor, and is preferably spaced to one side of the rotor axis, whereby the two axes are non-intersecting. Furthermore, the axis about which the stator structure is adjustable preferably extends through or adjacent the center of gravity of the stator, whereby when the latter is in desired adjusted position, and there held tight by the screws 31, it will have a minimum tendency to rotate about that axis due to jolts or vibrations applied to the apparatus as a whole.

With the screws 31 loose, the stator may be tilted or rotatably adjusted about the aforesaid axis for procuring substantial parallelism between its plates and those of the rotor structure. Furthermore, the apertures 32 in the supporting arms 29 are preferably elongated or partake of the form of slots, as indicated in Fig. 5, to permit adjustment of the stator element as a whole longitudinally of the axis of rotation of the rotor.

With the screws 31 loose as aforesaid, and suitable templet or spacer members temporarily inserted between the stator and rotor plates when in interleaved position, the stator element is in effect adjusted to desired position, both as regards position longitudinally of the rotor axis and as regards adjustment about the axis of the screws or its pivotal supports 31, and the screws 31 may now be tightened and the templet or spacer members removed, and the stator will then remain in proper adjustment with respect to the rotor, which during the aforesaid adjustment is in its operative position indicated with respect to its bearing member 15.

While it is my preference, as indicated, to support or secure the stator element solely at its aforesaid axis about which it is adjustable, it will be understood that it may be held supported by a greater number of screws or equivalents, provided, however, a sufficient play or clearance about such screws is provided to permit in effect the aforesaid adjustment about an axis at right angles to the rotor axis.

Furthermore, the aforesaid apertures 32 may be of sufficient width vertically, Fig. 5, to permit also an adjustment, if desired, of the stator element toward or away from the rotor axis in the direction of the planes of the stator and rotor leaves s and r to effect desired maximum capacity.

From the foregoing description it is apparent that in accordance with one of the features of my invention the main panel of a receiving set is included in and constitutes a part of each of the condenser structures or units whose rotor and stator elements are secured independently of each other and of their supports to the panel, and the relative position of stator and rotor elements is determined by their respective attachments to their common panel.

It is further apparent that the panel, as 7, upon which are mounted elements of the receiving set other than the condensers, is common to and comprehended in and is a part of a plurality of condenser units electrically related to other elements of the set.

What I claim is:

1. A radio set comprising a variable condenser unit, devices electrically associated therewith, and a metallic panel, said condenser unit supported solely on said panel and consisting of said panel and the rotor and stator condenser elements.

2. In a radio set comprising a variable condenser unit and devices electrically associated therewith, a metal panel for said set, and means for holding the rotor and stator elements of said condenser unit in operative relation to each other comprising said panel and means for securing said rotor and stator elements independently of each other to said panel solely.

3. In a radio set comprising a variable condenser unit and devices electrically associated therewith, a metal panel for said set, and metallic supports for the rotor and stator elements of said condenser unit secured independently of each other to said panel to thereby include said panel in said condenser unit for determining the positions of said rotor and stator elements with respect to each other, said condenser unit supported solely on said panel.

4. In a radio set comprising a variable condenser unit and devices electrically associated therewith, a panel for said set, supports for the rotor and stator elements of said condenser unit secured independently of each other to said panel to thereby include said panel in said condenser unit for determining the positions of said rotor and stator elements with respect to each other, said condenser unit supported solely on said panel and means for supporting one or more of said electrically associated devices upon said panel.

5. In a radio set comprising a variable condenser unit and devices electrically associated therewith, a panel for said set, supports for the rotor and stator elements of said condenser unit secured independently of each other to said panel to thereby include said panel in said condenser unit for determining the positions of said rotor and stator elements with respect to each other, a ledge member secured to said panel, and means for supporting one or more of said electrically associated devices upon said ledge member.

6. In a radio set comprising a plurality of variable condenser units and devices electrically associated therewith, a panel for said set, and supports for the rotor and stator elements of each of said condenser units secured independently of each other to said panel to thereby include said panel as an element common to and comprehended in each of said condenser units and for determining the positions with respect to each other of the rotor and stator elements of each condenser unit, each of said condenser units supported solely on said panel.

7. The combination with a panel, of rotor and stator elements of a condenser, supports for said rotor and stator elements secured independently of each other to said panel to form a condenser unit including said panel, and a spring on the opposite side of said panel from said rotor and stator elements effecting an axial thrust upon said rotor element.

8. The combination with a panel, of rotor and stator elements of a condenser, supports for said rotor and stator elements secured independently of each other to said panel to form a condenser unit including said panel, and a floating spring on the opposite side of said panel from said rotor and stator elements exerting an axial thrust on said rotor element.

9. The combination with a panel, of rotor and stator elements of a condenser, supports for said rotor and stator elements secured independently of each other to said panel to form a condenser unit including said panel, a member for actuating the rotor element disposed on the opposite side of said panel from said rotor element, and a floating spring on said opposite side of said panel engaging said panel and thrusting on said actuating member axially of said rotor element.

10. The combination with a panel, of rotor and stator elements of a condenser, a single bearing member for said rotor element secured to said panel and disposed between said rotor element and said panel whereby said rotor element overhangs beyond said bearing member, means supporting said stator element upon said panel, and a spring on the side of said panel opposite said rotor element exerting an axial thrust on said rotor element against said bearing member.

11. The combination with a panel, of rotor and stator elements of a condenser, a single bearing member for said rotor element secured to said panel and constituting the sole support of said rotor element and disposed between said rotor element and said panel whereby said rotor element overhangs beyond said bearing member, and means supporting said stator element upon said panel independently of the rotor support, said stator element supported solely on said panel.

12. The combination with a panel of rotor and stator elements of a condenser, a single bearing member for said rotor element secured to said panel and constituting the sole support of said rotor element and disposed between said rotor element and said panel whereby said rotor element overhangs beyond said bearing member, means supporting said stator element upon said panel independently of the rotor support, and a spring on the side of said panel opposite said rotor element exerting an axial thrust on said rotor element against said bearing member.

13. The combination with a panel, of rotor and stator elements of a condenser, a single bearing member for said rotor element secured to said panel and having at its end remote from said panel a conical bearing for said rotor element, said bearing member constituting the sole support of said rotor element, means supporting said stator element upon said panel, and a spring thrusting said rotor element against said conical bearing.

14. The combination with a panel, of rotor and stator elements of a condenser, a single bearing member for said rotor element secured to said panel and having at its end remote from said panel a conical bearing for said rotor element, said bearing member constituting the sole support of said rotor element, means supporting said stator element upon said panel, and a spring on the side of said panel opposite said rotor element thrusting it against said conical bearing.

15. The combination with a panel, of rotor and stator elements of a condenser, a single tubular bearing member for said stator element, said panel having an aperture, said bearing member extending through said aperture and having its end embracing said panel at the edge of said aperture, said bearing member constituting the sole support for said rotor element and disposed between said rotor element and said panel whereby said rotor element overhangs beyond said bearing member, and means supporting said stator element upon said panel.

16. The combination with the stator and rotor elements of a condenser, of a fixed support, and a single bearing for said rotor element carried by said support and beyond which said rotor element is overhung, means supporting said stator element on said support for permitting its adjustment about an axis substantially at right angles to the axis of rotation of said rotor element.

17. The combination with the stator and rotor elements of a condenser, of a fixed support, and a single bearing for said rotor element carried by said support and beyond which said rotor element is overhung, means supporting said stator element on said support for permitting its adjustment about an axis substantially at right angles to and spaced to one side of the axis of rotation of said rotor element.

18. The combination with the stator and rotor elements of a condenser, of a fixed support, and a single bearing for said rotor element carried by said support and beyond which said rotor element is overhung, means supporting said stator element on said support for permitting its adjustment about an axis substantially at right angles to the axis of rotation of said rotor element and in a direction parallel with said axis of rotation of the rotor element.

19. The combination with rotor and stator elements of a condenser comprising substantially parallel plates, of a fixed support, and a single bearing for said rotor element carried by said support and beyond which said rotor element is overhung, means supporting said stator elements on said support for permitting its adjustment about an axis substantially at right angles to the axis of rotation of said rotor element and in a direction substantially parallel with the planes of said plates.

20. The combination with rotor and stator elements of a condenser comprising substantially parallel plates, of a fixed support, and a single bearing for said rotor element carried by said support and beyond which said rotor element is overhung, means supporting said stator element on said support for permitting its adjustment in directions substantially parallel with the plane of said plates and substantially parallel with the axis of rotation of said rotor element.

21. The combination with a panel, of rotor and stator elements of a condenser, means for supporting said rotor element upon said panel, arms secured to said panel independently of said rotor-supporting means, and co-axial pivot members supporting said stator element and carried respectively by said arms.

22. The combination with a panel, of rotor and stator elements of a condenser, means for supporting said rotor element upon said panel, and means for independently supporting said stator element upon said panel comprising a supporting member having arms, and co-axial pivot members supporting said stator element and carried respectively by said arms.

23. The combination with a panel, of rotor and stator elements of a condenser, means for supporting said rotor element upon said panel, arms secured to said panel independently of said rotor-supporting means, and co-axial pivot members supporting said stator element and extending respectively through apertures in said arms permitting adjustment of said stator element substantially parallel with the axis of rotation of said rotor element.

24. The combination with a panel, of rotor and stator elements of a condenser, means for supporting said rotor element upon said panel, arms secured to said panel independently of said rotor-supporting means, and co-axial pivot members supporting said stator element extending respectively through apertures in said arms permitting adjustments of said stator element about an axis substantially at right angles to the rotor axis and in a direction substantially parallel with said rotor axis.

25. The combination with a panel, of rotor and stator elements of a condenser comprising substantially parallel plates, means for supporting said rotor element upon said panel, arms secured to said panel independently of said rotor-supporting means, and co-axial pivot members supporting said stator element and extending respectively through apertures in said arms permitting adjustment of said stator element in directions substantially parallel with the axis of rotation of said rotor element and substantially parallel with the planes of said plates.

26. The combination with a panel, of rotor and stator elements of a condenser comprising substantially parallel plates, means for supporting said rotor element upon said panel, arms secured to said panel independently of said rotor-supporting means, and co-axial pivot members supporting said stator element and extending respectively through apertures in said arms permitting adjustment of said stator element in a direction substantially parallel with the planes of said plates and about an axis substantially at right angles to the axis of rotation of said rotor element.

27. The combination with a panel, of rotor and stator elements of a condenser, means for supporting said rotor element upon said panel, a support for said stator element secured to said panel independently of said rotor-supporting means, and means carrying said stator element upon said support permitting its adjustment about an axis substantially at right angles to the axis of rotation of said rotor element.

28. The combination with a panel, of rotor and stator elements of a condenser, means for supporting said rotor element upon said panel, a support for said stator element secured to said panel independently of said rotor-supporting means, and means carrying said stator element upon said support permitting its adjustment about an axis substantially at right angles to and displaced to one side of the axis of rotation of said rotor element.

29. The combination with a panel, of rotor and stator elements of a condenser, means for supporting said rotor element upon said panel, a support for said stator element secured to said panel independently of said rotor-supporting means, and means carrying said stator element upon said support permitting its adjustment about an axis substantially at right angles to the axis of rotation of said rotor element and in a direction substantially parallel with said axis of rotation of said rotor element.

30. The combination with a panel, of rotor and stator elements of a condenser comprising substantially parallel plates, means for supporting said rotor element upon said panel, a support for said stator element secured to said panel independently of said rotor-supporting means, and means carrying said stator element upon said support permitting its adjustment in a direction substantially parallel with the planes of said plates.

31. The combination with a panel, of rotor and stator elements of a condenser comprising substantially parallel plates, means for supporting said rotor element upon said panel, a support for said stator element secured to said panel independently of said rotor-supporting means, and means carrying said stator element upon said support permitting its adjustment in a direction substantially parallel with the planes of said plates and about an axis substantially at right angles to the axis of rotation of said rotor element.

32. The combination with a panel, of rotor and stator elements of a condenser comprising substantially parallel plates, means for supporting said rotor element upon said panel, a support for said stator element secured to said panel independently of said rotor-supporting means, and means carrying said stator element upon said support permitting its adjustment in a direction substantially parallel with the planes of said plates and in a direction substantially parallel with the axis of rotation of said rotor element.

33. The combination with a metallic panel, of rotor and stator elements of a plurality of condensers, metallic supports for said rotor and stator elements of each condenser secured independently of each other to and electrically connecting with said panel to form a condenser unit including said panel, and means for insulating one of said condenser elements of each condenser from its said support, said condensers supported solely on said panel which is included in the condenser units.

ARTHUR ATWATER KENT.